May 15, 1945. A. THOMAS 2,375,963
PROCESS OF MANUFACTURING LIGHT POLARIZING MATERIAL
Filed May 7, 1943
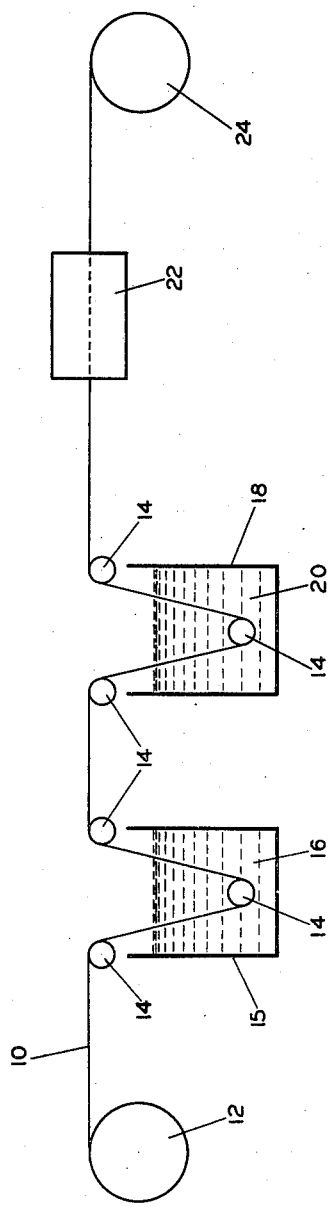
Alexander Thomas
INVENTOR.
BY Donald L. Brown
Attorney Patented May 15, 1945

2,375,963

UNITED STATES PATENT OFFICE 2,375,963

PROCESS OF MANUFACTURING LIGHT-POLARIZING MATERIAL

Alexander Thomas, Weston, Mass., assignor to Polaroid Corporation, Cambridge, Mass., a corporation of Delaware Application May 7, 1943, Serial No. 486,015

14 Claims. (Cl. 18—48)

This invention relates to a new and improved process for the formation of sheets of light-polarizing material.

It is one object of the present invention to provide a process for improving the quality and properties of light-polarizing sheets or films of the type described in Patent No. 2,237,567, issued April 8, 1941, to Edwin H. Land.

Another object of the invention is to provide an improved process for forming light-polarizing material by the incorporation of a polyiodide stain in sheets or films of a suitable transparent plastic material, particularly a polyvinyl oxy compound such as polyvinyl alcohol or a suitable derivative of polyvinyl alcohol.

A further object is to provide a process for the purpose outlined above which includes the steps of treating sheets or films of the desired plastic material with a solution containing iodine and then treating said sheets or films with a solution adapted to remove a predetermined portion of said iodine solution, particularly so much thereof as fails to combine with said sheet.

Other objects and advantages will in part appear and in part be pointed out in the course of the following description of one or more embodiments of the invention, which are given as non-limiting examples, in connection with the accompanying drawing, which is a diagrammatic view illustrating an arrangement of apparatus suitable for use in the practice of the invention.

Patent No. 2,237,567 discloses the production of light-polarizing material in sheet form in a variety of ways, including the application of an iodine solution to a sheet of polyvinyl alcohol which had previously been stretched to orient the molecules therein. In accordance with the present invention, it has been discovered that light-polarizing sheet material of greatly improved properties, particularly with respect to stability, may be produced by utilizing a relatively strong iodine solution and by following the treatment of the sheet with said solution with a further treatment adapted to remove a predetermined portion of said iodine solution, particularly so much thereof as is absorbed by the sheet but fails to combine therewith.

In carrying out one embodiment of the process of the invention, a sheet of the desired plastic material, such as polyvinyl alcohol or a suitable polyvinyl alcohol derivative, may first be stretched to orient the molecules. The degree of stretch may vary considerably, depending upon the purpose to which the sheet is to be put, and generally speaking a stretch of four to five times is quite satisfactory. It has also been found advantageous to follow the stretching operation with a baking treatment. For example, treating the sheet for ten to fifteen minutes at a temperature of approximately 145 degrees C. has been found satisfactory, although this step may be varied to a wide extent without departing from within the scope of the invention.

The stretched and baked sheet should then be dipped or otherwise treated with a suitable iodine solution to develop a dichroic stain therein. For example, in the drawing sheet 10 is illustrated as passing from supply roll 12 over idler rolls 14 through tank 15 containing a relatively strong iodine solution 16. The composition of solution 16 may be varied considerably but, as one illustrative example, it may comprise 10 to 20 c. c. of hydriodic acid and 700 c. c. of water, to which sufficient iodine is added to form a saturated solution. As another example, solution 16 may comprise 5 grams of crystalline iodine and 50 grams of ammonium iodide added to approximately 1000 c. c. of water. A substantial amount, for example 50 percent, of a non-solvent of polyvinyl alcohol, such for example as methanol, may be added if desired for the purpose of slowing the staining action of the iodine solution. The time of treatment with solution 16 depends both upon the composition of said solution and the desired density of stain to be obtained. With a solution of approximately the composition given above, a suitable time will be 10 to 15 seconds.

The next step of the process of the invention is to treat sheet 10 to remove therefrom the surplus of solution 16, including particularly so much thereof as fails to combine with the material of the sheet, or at least so much of said uncombined solution as remains adjacent the surface of the sheet. This may be done by washing, and excellent results have been obtained by treating the sheet with water for approximately the same length of time as the previous treatment with solution 16. Thus, in the drawing, sheet 10 is illustrated as passing from tank 15 through a second tank 18 which may be filled with water, as indicated at 20. If desired, acetone or another suitable non-solvent of polyvinyl alcohol may be added to solution 20 but is not required. It should be noted that the washing step may result also in the removal of some of the iodine which has combined with the material of the sheet and so partially lighten the stain therein, but this result may be compensated for by the use of a relatively strong iodine solution as pointed out above.

At the completion of the washing treatment, sheet 10 should be thoroughly dried in any suitable way. For example, in the drawing a drying oven 22 is indicated between tank 18 and take-up roll 24, but adequate drying may be obtained by means of circulating warm air, or simply by relatively prolonged exposure of sheet 10 to the atmosphere. In the case of an oven, highly satisfactory results have been obtained by baking the sheet for approximately an hour and a half at a temperature of the order of 60 degrees C., although this time and temperature are by no means critical.

The product of the above process has been found to have greatly increased stability, particularly with respect to heat, over similar polarizing sheet material which has not been subjected to the baking and washing steps of the invention. Furthermore, although either of said steps without the other produces some improvement in the stability of the polarizing sheet, both in combination produce a far greater degree of improvement than is comparable to the results of the two steps considered separately. It should also be noted that the invention is not limited to use in connection with polyvinyl alcohol, but is applicable also to other linear polyvinyl oxy compounds, particularly the cyclic ethers of polyvinyl alcohol such as the acetals and ketals. The term "acetals and ketals of polyvinyl alcohol" is to be understood as generic to the class of resins formed from polyvinyl acetate by the successive or combined steps of hydrolysis and condensation with aldehydes or ketones respectively.

Since certain changes in carrying out the above process may be made without departing from the scope of the invention, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In a process of manufacturing light-polarizing material from a molecularly oriented sheet comprising a linear polyvinyl oxy compound, the steps comprising staining said sheet with a solution comprising iodine, and removing from said sheet a predetermined portion of the staining solution remaining uncombined with the material thereof.

2. In a process of manufacturing light-polarizing material from a molecularly oriented sheet comprising a linear polyvinyl oxy compound, the steps comprising baking said sheet, staining said sheet with a solution comprising iodine, and removing from said sheet a predetermined portion of the staining solution remaining uncombined with the material thereof.

3. In a process of manufacturing light-polarizing material from a molecularly oriented sheet comprising a linear polyvinyl oxy compound, the steps comprising baking said sheet at a temperature of approximately 145 degrees C., staining said sheet with a solution comprising iodine, and removing from said sheet a predetermined portion of the staining solution remaining uncombined with the material thereof.

4. In a process of manufacturing light-polarizing material from a molecularly oriented sheet comprising a linear polyvinyl oxy compound, the steps comprising baking said sheet, staining said sheet with a solution comprising iodine and an iodide, and removing from said sheet a predetermined portion of the staining solution remaining uncombined with the material thereof by washing said stained sheet.

5. In a process of manufacturing light-polarizing material from a molecularly oriented sheet comprising a linear polyvinyl oxy compound, the steps comprising baking said sheet, staining said sheet with a solution comprising iodine, an iodide and a non-solvent of the material of said sheet, and removing from said sheet a predetermined portion of the staining solution remaining uncombined with the material thereof by washing said stained sheet, and drying said washed sheet.

6. In a process of manufacturing light-polarizing material from a molecularly oriented sheet comprising a linear polyvinyl oxy compound, the steps comprising baking said sheet, staining said sheet with a solution comprising iodine and an iodide, and removing from said sheet a predetermined portion of the staining solution remaining uncombined with the material thereof by washing said stained sheet with water and drying said washed sheet.

7. In a process of manufacturing light-polarizing material from a molecularly oriented sheet comprising a linear polyvinyl oxy compound, the steps comprising staining said sheet with a solution comprising iodine, and removing from said sheet a predetermined portion of the staining solution remaining uncombined with the material thereof by washing said stained sheet and drying said washed sheet.

8. In a process of manufacturing light-polarizing material from a molecularly oriented sheet comprising a linear polyvinyl oxy compound, the steps comprising staining said sheet with a solution comprising iodine and an iodide, and removing from said sheet a predetermined portion of the staining solution remaining uncombined with the material thereof by washing said stained sheet.

9. In a process of manufacturing light-polarizing material from a molecularly oriented sheet comprising a linear polyvinyl oxy compound, the steps comprising staining said sheet with a solution comprising iodine and an iodide, and removing from said sheet a predetermined portion of the staining solution remaining uncombined with the material thereof by washing said stained sheet with water and drying said washed sheet.

10. In a process of manufacturing light-polarizing material from a molecularly oriented sheet comprising a linear polyvinyl oxy compound, the steps comprising baking said sheet at a temperature of approximately 145 degrees C., staining said sheet with a solution comprising iodine, an iodide and a non-solvent of the material of said sheet, and removing from said sheet a predetermined portion of the staining solution remaining uncombined with the material thereof by washing said stained sheet with water and drying said washed sheet.

11. A process comprising forming a sheet of polyvinyl alcohol, stretching said sheet to orient its molecules, staining said sheet with a solution comprising iodine and washing said stained sheet to remove such of said iodine stain as remains uncombined therewith.

12. A process comprising forming a sheet of polyvinyl alcohol, stretching said sheet to orient its molecules, baking said sheet to harden it, staining said sheet with a solution comprising iodine and washing said stained sheet to remove such of said iodine stain as remains uncombined therewith.

13. In a process of manufacturing light-polarizing material from a molecularly oriented sheet comprising a linear polyvinyl oxy compound, the steps comprising staining said sheet with a solution comprising iodine, and removing from said sheet a predetermined portion of the staining solution.

14. In a process of manufacturing light-polarizing material from a molecularly oriented sheet comprising a linear polyvinyl oxy compound, the steps comprising staining said sheet with a solution comprising iodine, and removing from said sheet a predetermined portion of the staining solution including a portion thereof which has combined with the material of said sheet and a portion of said solution remaining uncombined with the material of said sheet.

ALEXANDER THOMAS.